US008807665B2

(12) United States Patent
Perry

(10) Patent No.: US 8,807,665 B2
(45) Date of Patent: Aug. 19, 2014

(54) VEHICLE WHEEL LIFTING BLOCK APPARATUS FOR CLIMBING OUT OF DEPRESSION IN VISCOUS SURFACES

(76) Inventor: James Perry, Ft. Lauderdale, FL (US)

(*) Notice: Subject to any disclaimer, the term of this patent is extended or adjusted under 35 U.S.C. 154(b) by 412 days.

(21) Appl. No.: 13/175,629

(22) Filed: Jul. 1, 2011

(65) Prior Publication Data

US 2012/0119564 A1 May 17, 2012

Related U.S. Application Data

(60) Provisional application No. 61/412,497, filed on Nov. 11, 2010.

(51) Int. Cl.
*B60B 15/00* (2006.01)
*B60B 15/18* (2006.01)

(52) U.S. Cl.
USPC .......................................... 301/44.2; 301/44.1

(58) Field of Classification Search
USPC ................. 305/137, 194, 136, 145, 160, 178; 410/30, 7, 9, 19, 49; 152/226–229, 152/216, 225 R, 241, 218, 22
See application file for complete search history.

(56) References Cited

U.S. PATENT DOCUMENTS

| | | | | |
|---|---|---|---|---|
| 1,578,071 A | * | 3/1926 | Cadieux | 152/227 |
| 2,808,868 A | * | 10/1957 | Bryan | 152/228 |
| 4,098,313 A | * | 7/1978 | Ingerson | 152/213 R |
| 4,402,357 A | * | 9/1983 | Granryd | 152/216 |
| 5,454,412 A | * | 10/1995 | Bowers | 152/221 |
| 6,708,746 B2 | * | 3/2004 | Wilkinson | 152/221 |

* cited by examiner

*Primary Examiner* — Glenn Dayoan
*Assistant Examiner* — Sunsurraye Westbrook
(74) *Attorney, Agent, or Firm* — Oltman Flynn & Kubler; Frank L. Kubler

(57) ABSTRACT

A wheel lifting block apparatus includes a climbing block such as of rubber having a block abutting surface for placement against a tire tread and has a block traction surface facing outwardly from the tire tread; and block securing means for mounting the block on the circumferential tread surface of a tire after the tire has become embedded in a depression in a viscous surface to grip the viscous surface while lifting the tire relative to the viscous surface so that tire rotation causes the tire to climb out of the depression and advance to stable terrain. The block securing means preferably includes a strap slot extending through the block; and a strap having first and second strap ends and passing through the strap slot and having a length sufficient so that the first and second strap ends can wrap around a segment of a tire and through an opening in a vehicle wheel.

9 Claims, 5 Drawing Sheets

VEHICLE WHEEL LIFTING BLOCK APPARATUS FOR CLIMBING OUT OF DEPRESSION IN VISCOUS SURFACES

FILING HISTORY

This application continues from provisional patent application No. 61/412,497 filed on Nov. 11, 2010.

BACKGROUND OF THE INVENTION

1. Field of the Invention

The present invention relates generally to the fields of vehicle accessories and emergency equipment. More specifically the present invention relates to a vehicle wheel lifting block apparatus including a climbing block and block securing means for removably mounting the block on the circumferential tread surface of a tire after the tire has spun and become embedded in a rut or depression dug by the tire in a viscous surface such as sand, mud or snow, to grip the viscous surface while lifting the tire relative to the viscous surface so that tire rotation causes the tire to climb out of the depression and advance to stable terrain. Then the apparatus is removed from the tire and stored in the vehicle for future use.

The block preferably has a block thickness causing the block to protrude at least one half inch radially outward from the tire tread, the block also preferably has a block length generally equivalent to the width of the tire tread to extend across the entire tread surface, and optionally has a block width of about one half the block length. The preferred block material is a hard rubber similar or identical to that from which tires are made. The block has a block abutting surface for placement against the tire tread and has an opposing block traction surface facing outwardly from the tire tread. The block traction surface preferably has surface irregularities such as sine wave undulations forming longitudinally extending crests and troughs, or longitudinally parallel grooves separated by ribs.

The block securing means preferably includes a strap slot extending longitudinally through the block parallel to the block abutting surface. The block securing means further includes a strap passing through the strap slot and having a length sufficient so that first and second strap ends can wrap around a segment of the tire and through an opening in a vehicle wheel, and releasible strap end connection means for releasibly securing the strap ends together while the strap tightly grips the wheel and tire to hold the block firmly in position on the tire tread. The preferred strap end connection means is a cam buckle for use on truck tires, and mating hook and loop fastener patches for use on automobile tires, although either may be used for any vehicle.

2. Description of the Prior Art

There have long been instances in which a car or truck is immobilized in sand, mud or snow because a wheel has spun and dug a depression and cannot climb out of the depression. Particularly in remote snow covered areas, such circumstances can become life threatening. And even if one happens to have tire chains, which are bulky to store in a vehicle, they would likely be inadequate to free a vehicle in this situation, and they are difficult or impossible to install on an immobilized vehicle.

Other traction enhancing devices have existed but are not designed to or adapted for lifting a tire out of a viscous surface. The TPE Compact Ice Grabber™ by SPORTS IMPORTS, LLC., for example, is a panel of functionally negligible thickness for securing across the tread of a tire and has radially protruding cleats. The Grabber™ is intended to remain on the tire at all times to enhance traction on icy surfaces. It is not designed to and is not structurally capable of gripping a viscous surface in which a spinning tire has spun and become embedded, and lifting the tire relative to the viscous surface so that the tire can climb out of the depression.

It is thus an object of the present invention to provide vehicle wheel lifting block apparatus which can be secured to a vehicle tire tread when the wheel has become embedded and immobilized in a depression in a viscous surface, such after a wheel spins and forms a rut in sand, mud or snow, and lift the wheel as the wheel rotates so that the wheel can climb out of the depression and advance the vehicle to stable terrain.

It is another object of the present invention to provide such an apparatus which is highly compact and durable for convenient storage in a vehicle.

It is still another object of the present invention to provide such an apparatus which is easy to install while the vehicle is immobilized and then remove from a vehicle wheel, without need of any tools.

It is finally an object of the present invention to provide such an apparatus which is relatively inexpensive to manufacture.

SUMMARY OF THE INVENTION

The present invention accomplishes the above-stated objectives, as well as others, as may be determined by a fair reading and interpretation of the entire specification.

A wheel lifting block apparatus is provided, including a climbing block having a block abutting surface for placement against a tire tread and has a block traction surface facing outwardly from the tire tread; and block securing means for mounting the block on the circumferential tread surface of a tire after the tire has become embedded in a depression in a viscous surface to grip the viscous surface while lifting the tire relative to the viscous surface so that tire rotation causes the tire to climb out of the depression and advance to stable terrain.

The block has a block thickness preferably causing the block to protrude at least one half inch radially outward from the tire tread. The block has a block length preferably generally equivalent to the width of the tire tread to extend fully across the tread surface. The block has a block width preferably of substantially one half of the block length.

The block preferably is formed of one of hard rubber and tire tread material. The block traction surface preferably includes block traction surface irregularities. The block traction surface irregularities preferably include one of: sine wave undulations and parallel grooves separated by ribs.

The block securing means preferably includes a strap slot extending through the block; and a strap having first and second strap ends and passing through the strap slot and having a length sufficient so that the first and second strap ends can wrap around a segment of a tire and through an opening in a vehicle wheel, and releasible strap end connection means for releasibly securing the first and second strap ends together while the strap wraps around the wheel and the tire segment and thereby holds the block in position on the tire periphery.

The strap end connection means preferably includes at least one metal ring at said first strap end and mating hook and loop fastener patches along said second strap end. Two metal rings are preferred for truck tires and one metal ring is preferred for automobile tires, although either number can be used for either application. It is alternatively contemplated that a cam buckle or a ratchet strap be used in place of the metal rings and hook and loop faster patches, although the use of many other types of strap end connection means is contemplated.

A vehicle wheel assembly preferably includes a vehicle wheel with a wheel opening and a vehicle tire fitted onto the vehicle wheel having a tire periphery and a tire tread; and a block assembly comprising a climbing block having a block abutting surface for placement against a tire tread and has a block traction surface facing outwardly from the tire tread; and block securing means for mounting the block on the circumferential tread surface of a tire after the tire has become embedded in a depression in a viscous surface to grip the viscous surface while lifting the tire relative to the viscous surface so that tire rotation causes the tire to climb out of the depression and advance to more stable terrain.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
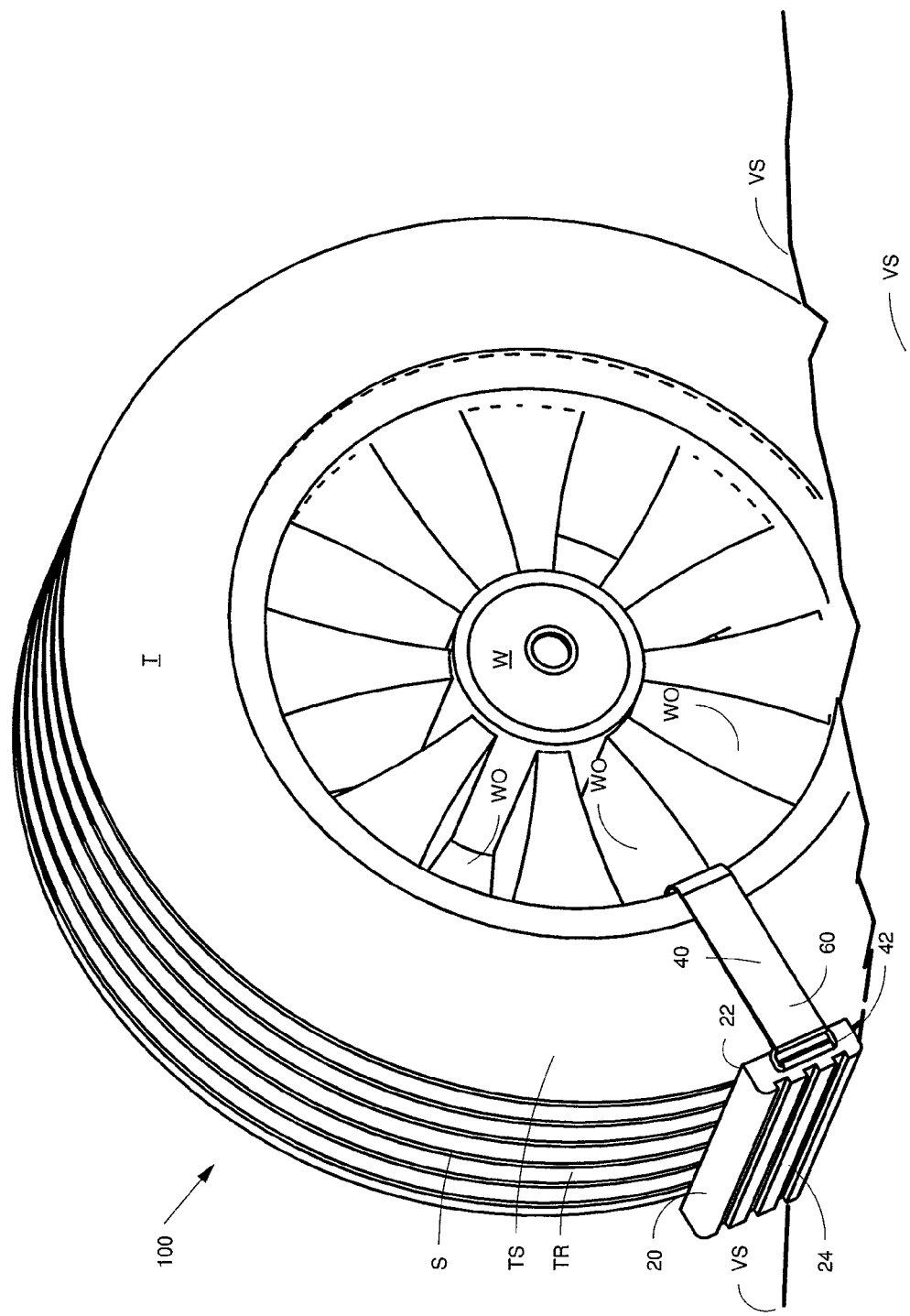
FIG. 1 is a perspective view of the preferred wheel assembly including a vehicle wheel and mounted tire fitted with the present wheel lifting block apparatus.
Figure 2:
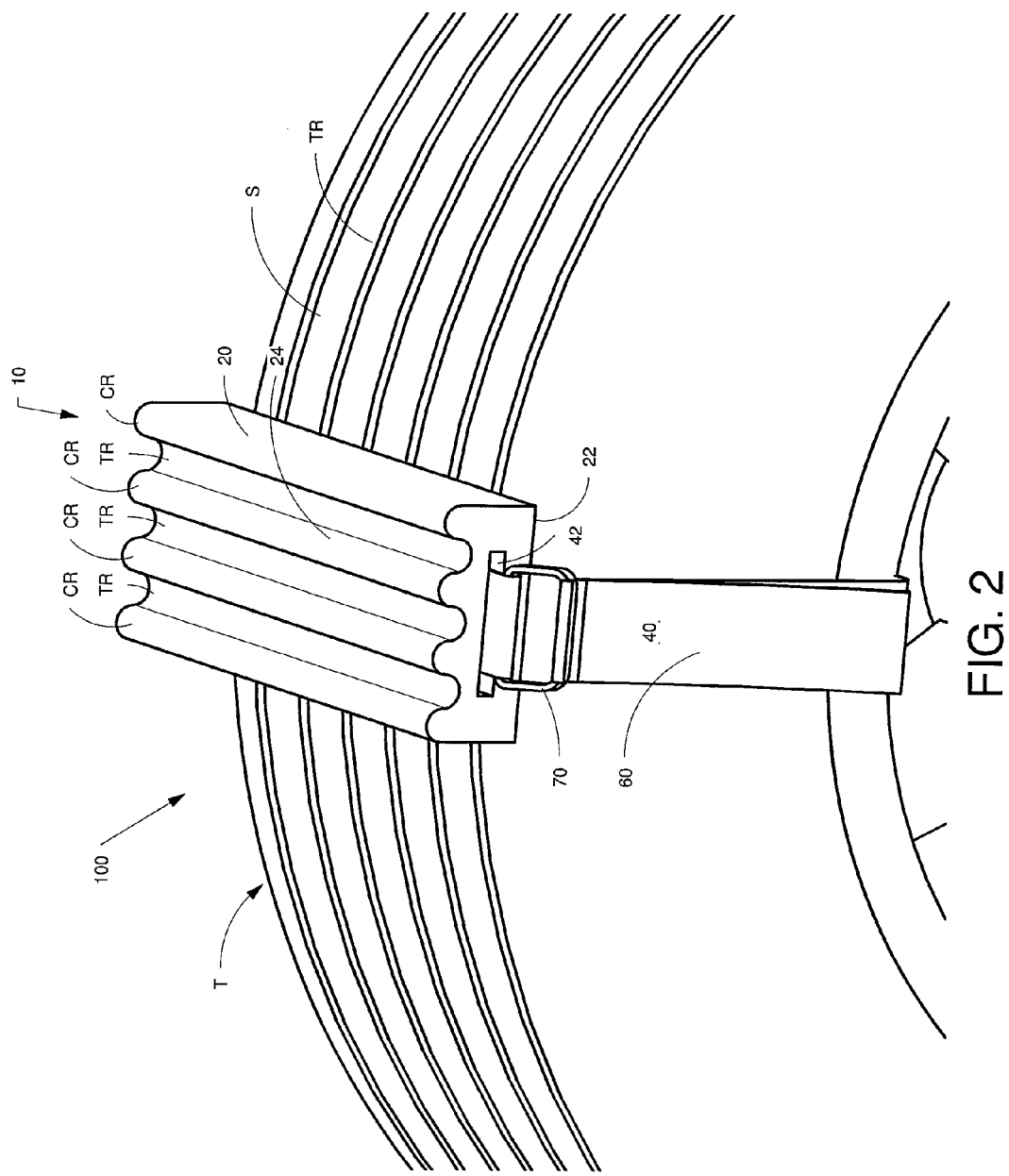
FIG. 2 is a broken away close-up view of the block apparatus and the tire segment on which the block apparatus is mounted, this particular block having the crest and trough undulations block traction surface.
Figure 3:
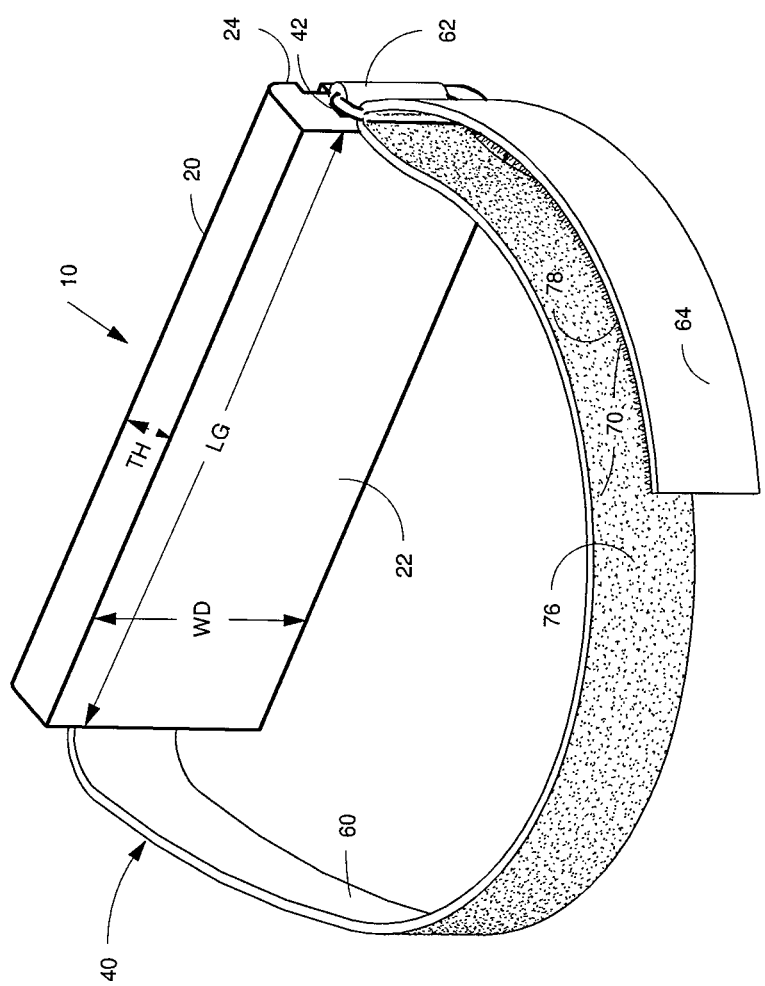
FIG. 3 is a perspective view of the block apparatus alone, having the hook and loop fastener strap end connection means.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-5, a vehicle wheel lifting block apparatus 10 is disclosed, having a climbing block 20 and block securing means 40 for removably mounting the 20 block on the circumferential tread TR surface S of a tire T after the tire T has spun and become embedded in a rut or depression dug by the tire T in a viscous surface VS such as sand, mud or snow, to grip the viscous surface VS while lifting the tire T relative to the viscous surface VS so that tire T rotation causes the tire T to climb out of the depression to reach a more stable terrain. Then the apparatus 10 is removed from the tire T for storage in the vehicle until needed again. A wheel assembly 100 is also provided including a vehicle wheel W, a vehicle tire T and the installed apparatus 10, viewed in combination.

The block 20 preferably has a block thickness TH causing the block 20 to protrude at least one half inch radially outward from the tire tread TR at the circumferential surface S. The block 20 also preferably has a block length LG generally equivalent to the width of the tire tread TR to extend across the entire tread TR surface, and optionally has a block width WD of substantially one half the block length LG.

Figure 4:
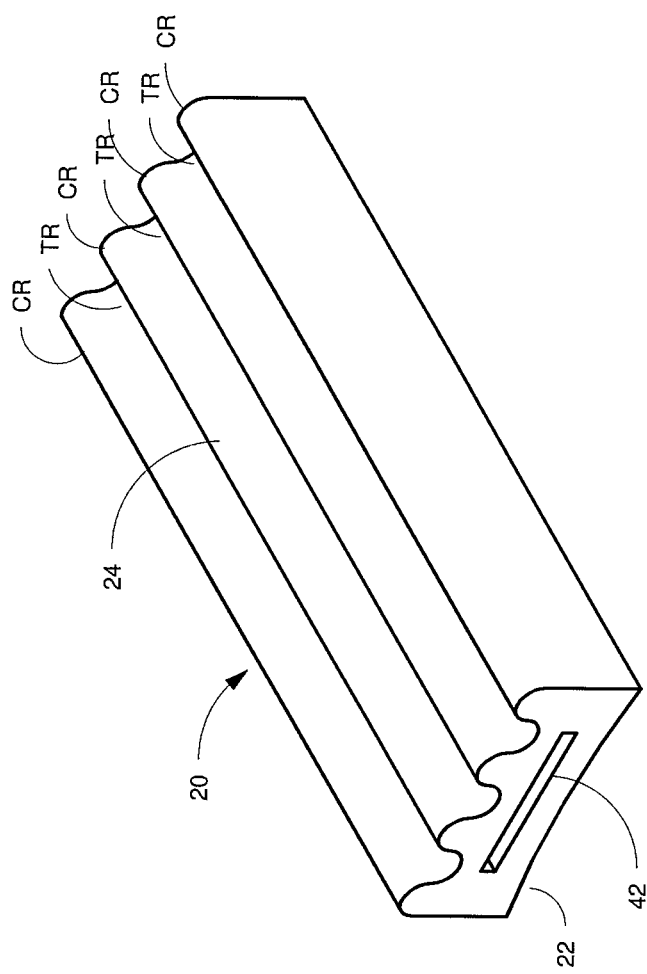
FIG. 4 is a perspective view of the climbing block only, having a block traction surface configured as longitudinal crest and trough undulations.
Figure 5:
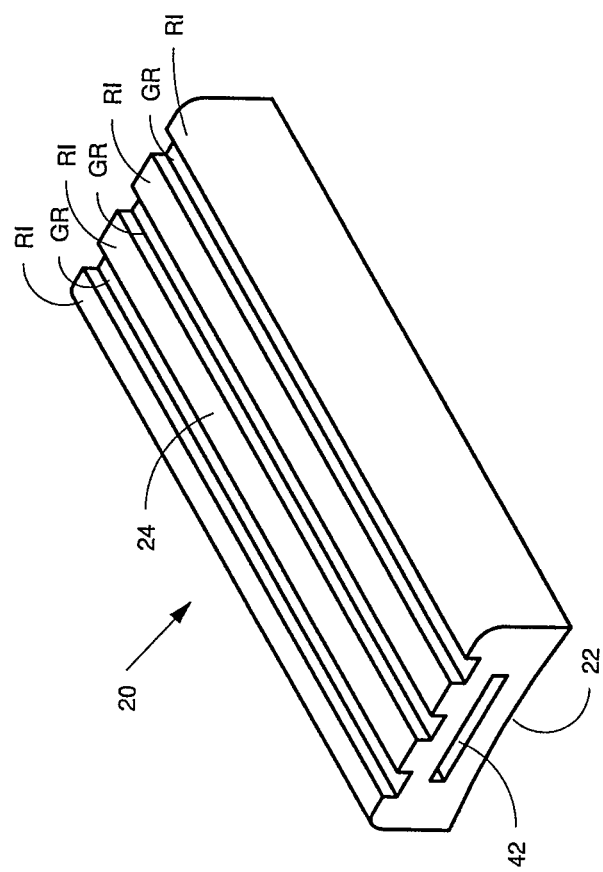
FIG. 5 is a perspective view of the climbing block only, having a block traction surface configured as longitudinal ribs and grooves.

The preferred block 20 material is a hard rubber similar or identical to that from which tires are made. The block 20 has a block abutting surface 22 for placement against the tire tread TR and has an opposing block traction surface 24 facing outwardly from the tire tread TR. The block traction surface 24 preferably has surface irregularities 30 for enhanced traction such as sine wave undulations with longitudinally extending crests CR and troughs TR as shown in FIG. 4, or longitudinal parallel grooves GR separated by ribs RI as shown in FIG. 5. The block traction surface 24 may have any desired configuration or texture, or may simply be smooth, and may be either parallel with or at an angle relative to the block abutting surface 22.

The block securing means 40 preferably includes a strap slot 42 extending longitudinally through the block 20 parallel to the block abutting surface 22. The block securing means 40 preferably further includes a strap 60 passing through the strap slot 42 and having a length sufficient so that first and second strap ends 62 and 64, respectively, can wrap around segment TS of the tire T and through an opening WO in a vehicle wheel W, and releasible strap end connection means 70 for releasibly securing the strap ends 62 and 64 together while the strap 60 tightly grips the wheel W and tire T to hold the block 20 firmly in position on the tire tread TR. The preferred strap end connection means 70 is two metal rings mounted through a looped segment of the first strap end 62 through which the second strap end is passed and mating hook and loop fastener patches 76 and 78 along the second strap end 64 on truck tires T, and a single metal ring mounted through a looped segment of the first strap end 62 through which the second strap end 64 is passed and mating hook and loop fastener patches 76 and 78 for use on automobile tires T, although either may be used for any vehicle. The portion of the second strap end 64 having the hook fastener patch 76 is passed through the metal ring 72 or metal rings 72 and 74, and then folded back against the loop fastener patch 78 which has not passed through the metal ring or rings 72 and 74. And, once again, it is alternatively contemplated that a cam buckle (not shown) or a ratchet strap (not shown) be used in place of the metal rings 72 and 74 and hook and loop faster patches 76 and 78, although the use of many other types of strap end connection means 70 is contemplated.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A vehicle and wheel assembly, comprising:
   a vehicle having a vehicle wheel with a wheel opening, and
     a vehicle tire fitted onto said vehicle wheel having a tire periphery with a circumferential tread surface and a tire tread;

and a climbing block having a block abutting surface resting against said tire tread and having a block traction surface facing outwardly from said tire tread; and block securing means securing said block against said circumferential tread surface, said block securing means comprising a strap slot extending through said block; and a strap having first and second strap ends and passing through said strap slot and having a length sufficient such that said first and second strap ends can be wrapped around and are wrapped around a segment of a tire and through said wheel opening in said vehicle wheel, and releasible strap end connection means for releasibly securing said first and second strap ends together while said strap wraps around said vehicle wheel and the tire segment and thereby holds said climbing block in position on said tire periphery, for use after the tire has become embedded in a depression in a viscous surface to grip the viscous surface while lifting the tire relative to the viscous surface such that tire rotation causes the tire to climb out of the depression and advance said vehicle to stable terrain.

2. The assembly of claim 1, wherein said block has a block thickness causing the block to protrude at least one half inch radially outward from the tire tread.

3. The assembly of claim 1, wherein said block has a block length generally equivalent to the width of the tire tread to extend fully across the tread surface.

4. The assembly of claim 3, wherein said block has a block width of substantially one half said block length.

5. The assembly of claim 1, wherein said block is formed of a hard rubber.

6. The assembly of claim 1, wherein said block is funned of ad material.

7. The assembly of claim 1, wherein said block traction surface comprises block traction surface irregularities.

8. The assembly of claim 7, wherein said block traction surface irregularities comprise one of: sine wave undulations and parallel grooves separated by ribs.

9. The assembly of claim 1, wherein said strap end connection means comprise at least one metal ring at said first strap end and mating hook and loop fastener patches along said second strap end.

\* \* \* \* \*